US011635100B2

(12) United States Patent
Yang et al.

(10) Patent No.: US 11,635,100 B2
(45) Date of Patent: Apr. 25, 2023

(54) JOINT STRUCTURE AND METHOD FOR ASSEMBLING A JOINT STRUCTURE (71) Applicant: National Applied Research Laboratories, Taipei (TW)

(72) Inventors: Yao-Yu Yang, Taipei (TW); Chia-Ming Chang, Taipei (TW); Fang-Yao Yeh, Taipei (TW); Shih-Chung Kang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 17/167,339

(22) Filed: Feb. 4, 2021

(65) Prior Publication Data

US 2022/0136538 A1 May 5, 2022

(30) Foreign Application Priority Data

Nov. 3, 2020 (TW) ................................. 109138330

(51) Int. Cl.
*F16B 5/00* (2006.01)
(52) U.S. Cl.
CPC ...................... *F16B 5/00* (2013.01)
(58) Field of Classification Search
CPC .......... F16B 5/00; F16B 5/0016; F16B 2/246; F16B 5/008
See application file for complete search history.

(56) References Cited

U.S. PATENT DOCUMENTS

| 2002/0152593 | A1 | 10/2002 | Hong | |
| 2003/0024200 | A1* | 2/2003 | Moriau | ...................... B27F 1/06 52/592.1 |
| 2020/0318667 | A1* | 10/2020 | Derelöv | ............... B27M 3/0066 |
| 2020/0376685 | A1* | 12/2020 | Baker | .................... B25J 9/1682 |

FOREIGN PATENT DOCUMENTS

| CN | 111655563 A | | 9/2020 | |
| GB | 2225404 A | * | 5/1990 | ............... B63B 3/18 |

OTHER PUBLICATIONS

Office Action corresponding to Taiwanese application No. 11020545690 dated Jun. 8, 2021. (pp. 8).

* cited by examiner

*Primary Examiner* — Moshe Wilensky
*Assistant Examiner* — Kyle A Cook
(74) *Attorney, Agent, or Firm* — Muncy, Geissler, Olds & Lowe, P.C.

(57) ABSTRACT

A joint structure installed in the physical structure is provided. The joint structure includes a first latching member and a second latching member. The first latching member includes a first main body, a head portion extending from the first main body and a first convex portion extending from the first main body. The second latching member includes a second main body, a second convex portion extending from the second main body and a third convex portion extending from the second main body. When the first latching member and the second latching member are in an assembling status, the first convex portion slides between the second convex portion and the third convex portion.

4 Claims, 8 Drawing Sheets

JOINT STRUCTURE AND METHOD FOR ASSEMBLING A JOINT STRUCTURE

CROSS REFERENCE TO RELATED APPLICATION

This application claims the benefits of the Taiwan Patent Application Serial Number 109138330, filed on Nov. 3, 2020, the subject matter of which is incorporated herein by reference.

BACKGROUND OF THE INVENTION

1. Field of the Invention

The present invention relates to a joint structure and method for assembling a joint structure. More particularly, the present invention relates to a joint structure for automated construction and method for assembling a joint structure.

2. Description of Related Art

In construction methods, high-quality buildings can be constructed quickly, and the workload and labor costs on the construction site can be reduced. This has long been the goal pursued by the construction industry. Moreover, because of the lack of technicians, the development of automated construction has been valued. However, the automated construction requires high initial investment costs, and technicians need to be retrained to be familiar with the automated construction process. Therefore, a structure that can assist the automated construction is required.

SUMMARY OF THE INVENTION

An objective of the present invention is to provide a joint structure. The joint structure comprises a first latching member and a first latching member. The first latching member comprises a first main body, a headend extending from the first main body, and a first convex portion extending from the first main body. The second latching member comprises a second main body, a second convex portion extending from the second main body, and a third convex portion extending from the second main body. When the first latching member and the second latching member are in an assembling status, the first convex portion is configured to slide between the second convex portion and the third convex portion.

In one embodiment, the headend and the first convex portion are extended from the first main body along a first direction; the second convex portion and the third convex portion are extended from the second main body along a second direction, and the first direction and the second direction are reversed.

In one embodiment, when the first latching member and the second latching member are in the assembling status, the first latching member is configured to rotatably engage the first convex portion to a concave portion, and the concave portion is formed between the second convex portion and the third convex portion.

In one embodiment, the headend includes a circular side; the circular side includes a third curvature rate, and the third curvature rate is larger than the first curvature rate.

In one embodiment, the second convex portion includes a second inner side edge and a second outer side edge; the second inner side edge and the second outer side edge are the arc-shaped; the second inner side edge includes the third curvature rate; the second outer side edge includes the second curvature rate.

In one embodiment, the third convex portion includes a third inner side edge; the third inner side edge is the arc-shaped; the third inner side edge includes the second curvature rate.

In one embodiment, when the first latching member and the second latching member are in the assembling status, the circular side of the headend abuts against the second inner side of the second convex portion, and the first convex portion is slidably engaged with the concave portion by utilizing a rotation method with the headend as a rotation center.

In one embodiment, when the first latching member and the second latching member are in the assembling status, the second inner side of the second convex portion abuts against the circular side of the headend, and the second convex portion is slidably engaged between the headend and the first convex portion by utilizing a rotation method with the headend as a rotation center.

An objective of the present invention is to provide a method for assembling a joint structure. The joint structure includes a first latching member and a second latching member. The first latching member includes a first main body, a headend extending from the first main body, and a first convex portion extending from the first main bod. The second latching member includes a second main body, a second convex portion extending from the second main body, and a third convex portion extending from the second main body. The method for assembling a joint structure comprising: calculating a first installed position of the first latching member and a second installed position of the second latching member, wherein the first installed position is located on a surface of a first entity, and the second installed position is located on a surface of a second entity; installing the first latching member in the first installed position and installing the second latching member in the second installed position; calculating a hanging position according to a centroid position of the first entity and calculating a center position of the surface of the first entity, when the first entity is in a hanging status, a first included angle is formed by a connecting direction of the hanging position and the centroid position and a connecting direction of the center position and the centroid position; and assembling the first latching member and the second latching member, when the first latching member and the second latching member are in an assembling status, the first entity is utilized the headend as a rotation center to rotate an angle formed by a second included angle to drive the first latching member to engage with the second latching member.

In one embodiment, the second included angle is the complementary angle of the first included angle.

In one embodiment, the headend abuts against the second inner side of the second convex portion, and the first latching member and the second latching member are in the assembling status.

In one embodiment, in the assembling status, the first entity is utilized the headend as the rotation center to rotate the angle formed by the second included angle; an outer peripheral edge of the first convex portion is engaged to an outer peripheral edge of the second convex portion, and slidably engaged between the second convex portion and the third convex portion.

In one embodiment, an inner side edge of the first convex portion is an arc-shaped, a degrees corresponding to the inner side edge of the first convex portion are the same as the angle formed by the second included angle.

In one embodiment, a curvature rate corresponding to the inner side edge of the first convex portion are the same as a curvature rate corresponding to an outer side edge of the second convex portion.

The joint structure and the method for assembling a joint structure are capable of utilizing the weight of the suspended object and its own rotation, and cooperating with the joint structure to achieve the effect of automatic assembly. Thus, the crane truck can use the joint structure to directly assemble the suspended objects, and does not require additional manpower and additional equipment to assist in calibration during assembly. In some embodiments, this disclosure is able to achieve the effect of reducing labor costs and increasing the speed of assembly.

DETAILED DESCRIPTION OF THE PREFERRED EMBODIMENT

Figure 1:
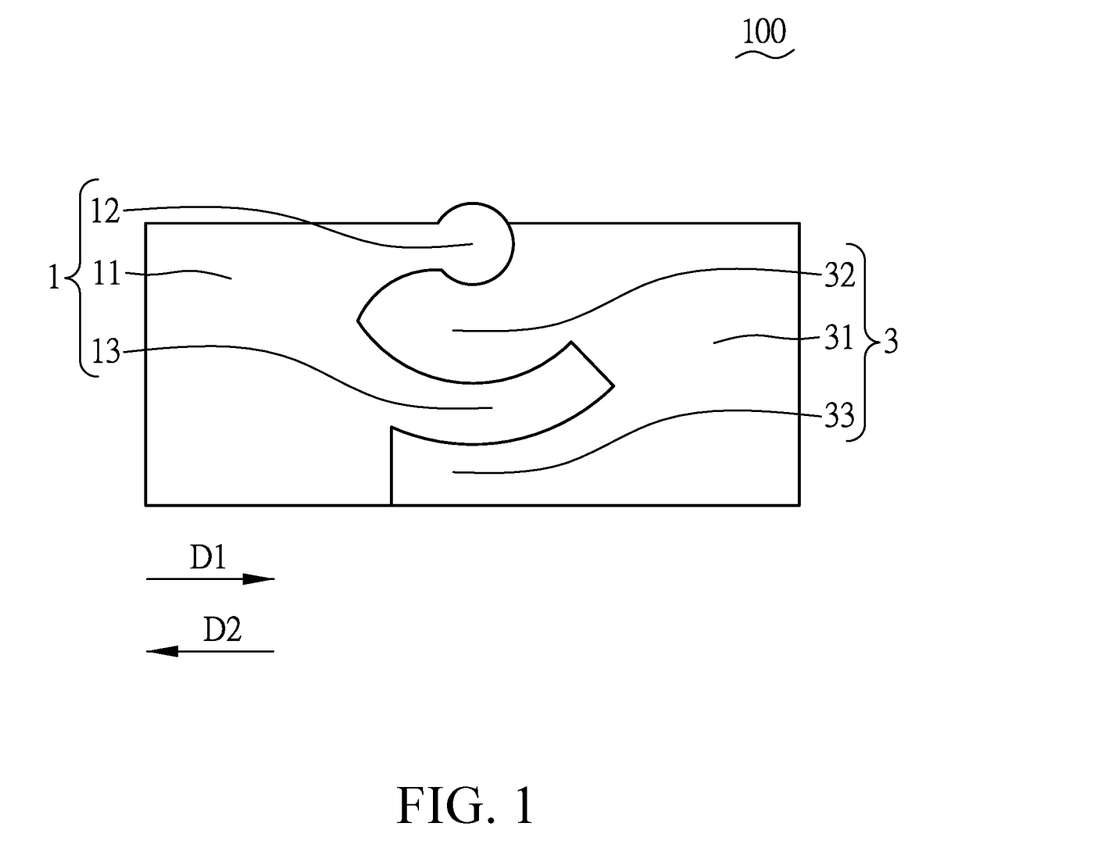
FIG. 1 is a schematic view showing an embodiment of the joint structure of the present invention.

Please refer to FIG. 1, which is a schematic view showing an embodiment of the joint structure 100 of the present invention. As shown in FIG. 1, the joint structure 100 includes a first latching member 1 and a second latching member 3. The first latching member 1 includes a first main body 11, a headend 12 extending from the first main body 11, and a first convex portion 13 extending from the first main body 11. The second latching member 3 includes a second main body 31, a second convex portion 32 extending from the second main body 31, and a third convex portion 33 extending from the second main body 31. It is noticed that, the headend 12 and the first convex portion 13 are extended from the first main body 11 along a first direction D1, and the second convex portion 32 and the third convex portion 33 are extended from the second main body 31 along a second direction D2, and the first direction D1 and the second direction D2 are reversed.

Figure 2:
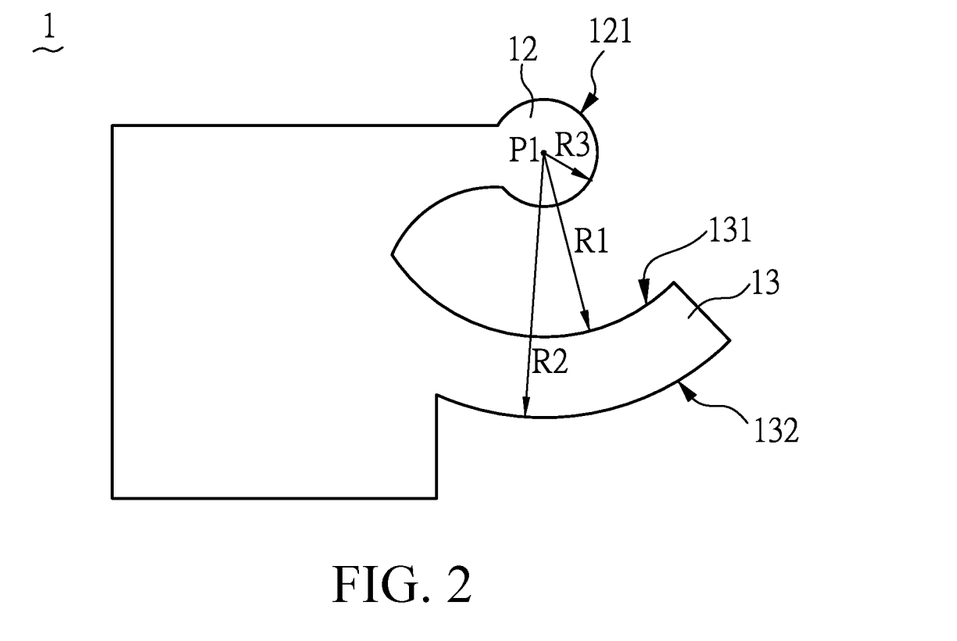
FIG. 2 is a schematic view showing an embodiment of the first latching member of the present invention.
Figure 3:
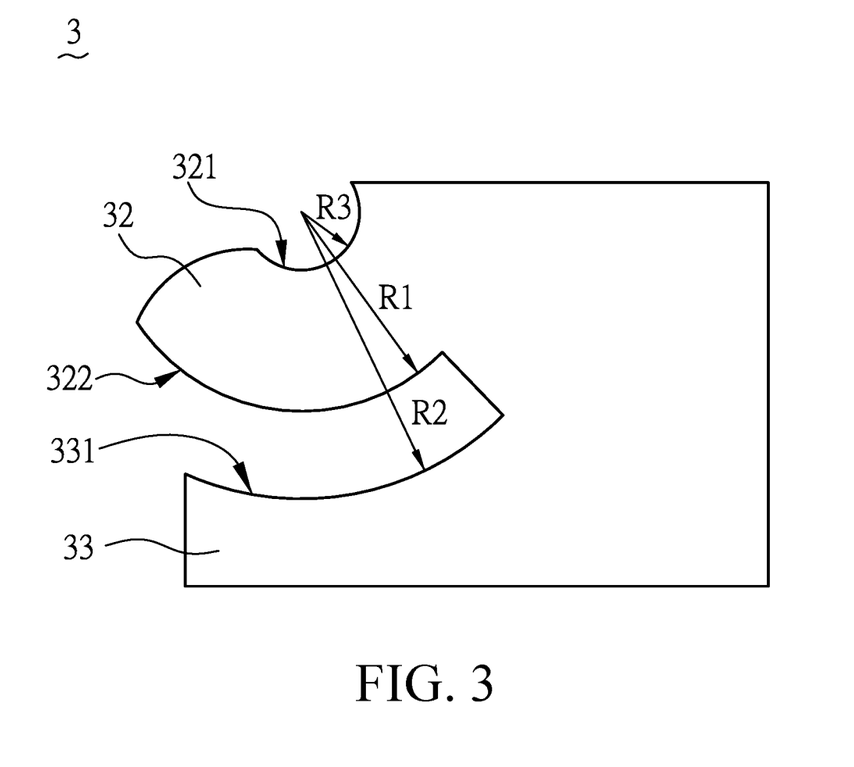
FIG. 3 is a schematic view showing an embodiment of the second latching member of the present invention.

Please refer to FIG. 2 and FIG. 3. FIG. 2 is a schematic view showing an embodiment of the first latching member 1 of the present invention, and FIG. 3 is a schematic view showing an embodiment of the second latching member 3 of the present invention. As shown in FIG. 2, the first convex portion 13 includes an inner side edge 131 and an outer side edge 132. The inner side edge 131 and the outer side edge 132 are an arc-shaped. In the embodiment, the inner side edge 131 of the first convex portion 13 is formed utilizing a center P1 and a radius R1; the outer side edge 132 of the first convex portion 13 is formed utilizing the center P1 and a radius R2, and a circular side of the headend 12 is formed utilizing the center P1 and a radius R3. It is noticed that, the inner side edge 131 includes a first curvature rate; the outer side edge 132 includes a second curvature rate, and the circular side 121 includes a third curvature rate. The first curvature rate is larger than the second curvature rate, and the third curvature rate is larger than the first curvature rate.

Afterwards, as shown in FIG. 3, the second convex portion 32 includes an inner side edge 321 and an outer side edge 322. The inner side edge 321 and the outer side edge 322 are the arc-shaped. In the embodiment, the inner side edge 321 of the second convex portion 32 is formed utilizing the center P1 and the radius R3, and the outer side edge 322 of the second convex portion 32 is formed utilizing the center P1 and the radius R1. Similarly, the third convex portion 33 includes an inner side edge 331, and the inner side edge 331 is the arc-shaped. Moreover, the inner side edge 331 of the third convex portion 33 is formed utilizing the center P1 and the radius R2. It is noticed that, the inner side edge 321 includes the third curvature rate; the outer side edge 322 includes the first curvature rate, and the inner side edge 331 includes the second curvature rate. The first curvature rate is larger than the second curvature rate, and the third curvature rate is larger than the first curvature rate.

Figure 4:
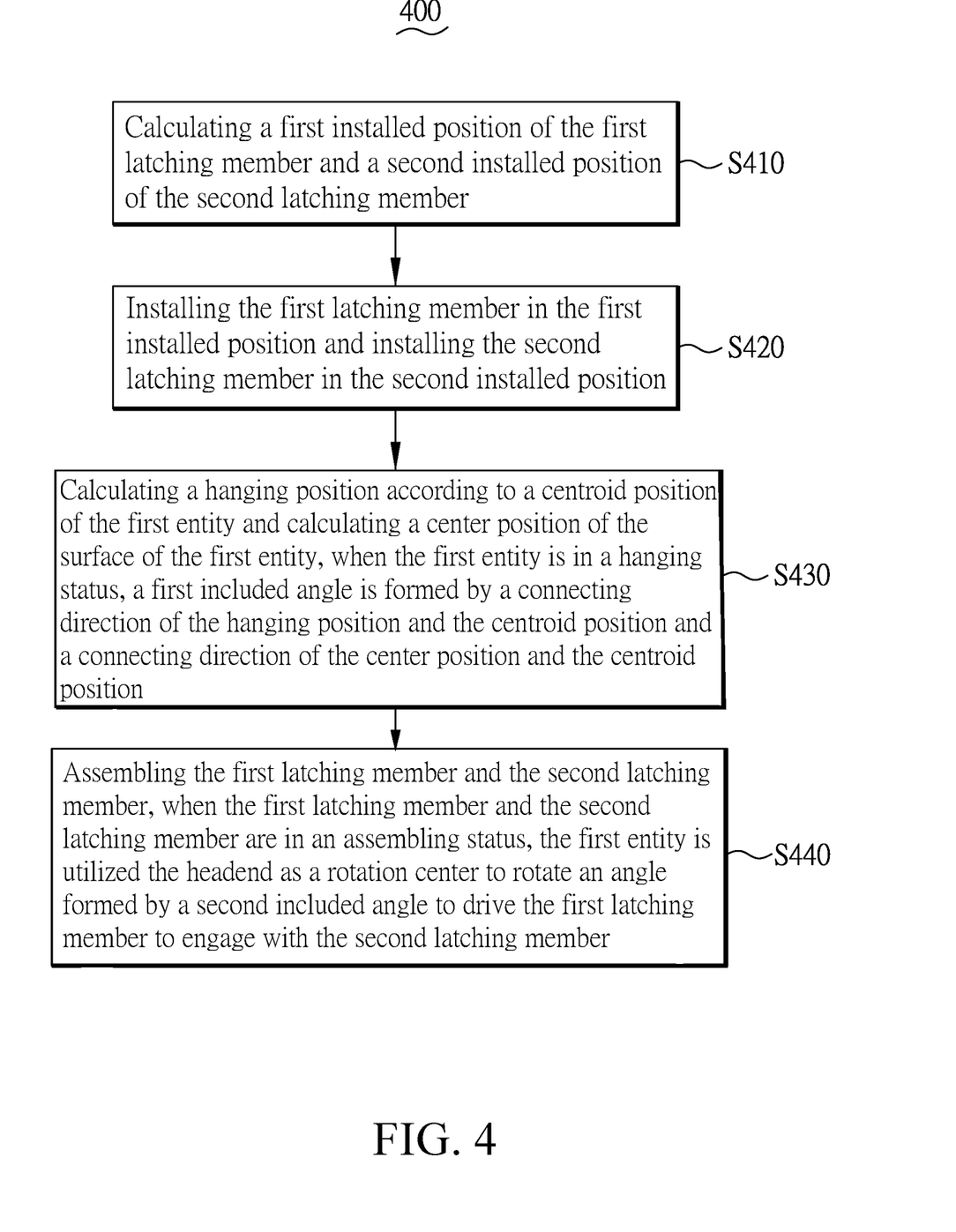
FIG. 4 is a flow diagram illustrating method for assembling a joint structure according to an embodiment of this disclosure.

Please refer to FIG. 4, which is a flow diagram illustrating method for assembling a joint structure according to an embodiment of this disclosure. In the embodiment, the method 400 for assembling a joint structure can be applied to the joint structure 100 of FIG. 1. The first latching member 1 and the second latching member 3 joint structure included in the joint structure 100 are respectively installed on the outer surfaces of different entities, and different entities can be connected to each other by the first latching member 1 and the second latching member 3.

Figure 5:
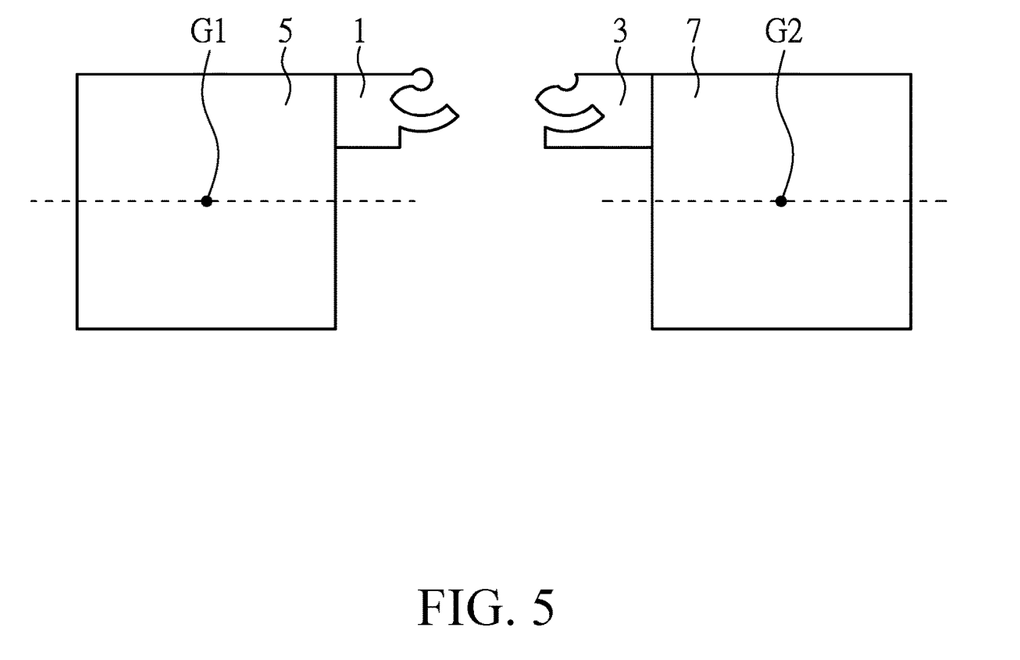
FIG. 5 is a schematic view showing an embodiment of the joint structure installed on the entities of the present invention.

Afterwards, the method 400 firstly executes step S410 to calculate a first installed position of the first latching member and a second installed position of the second latching member, and step S420 to install the first latching member in the first installed position and to install the second latching member in the second installed position. In the embodiment, reference is made to FIG. 5, which is a schematic view showing an embodiment of the joint structure installed on the entities of the present invention. The first installed position is located on a surface of a first entity 5, and the second installed position is located on a surface of a second entity 7. As shown in FIG. 5, the first installed position is higher than centroid position G1 of the first entity 5. Similarly, the second installed position is higher than centroid position G2 of the second entity 7. It is noticed that, the second installed position is corresponding to the first installed position so that the first entity 5 and the second entity 7 can be engaged.

Figure 6:
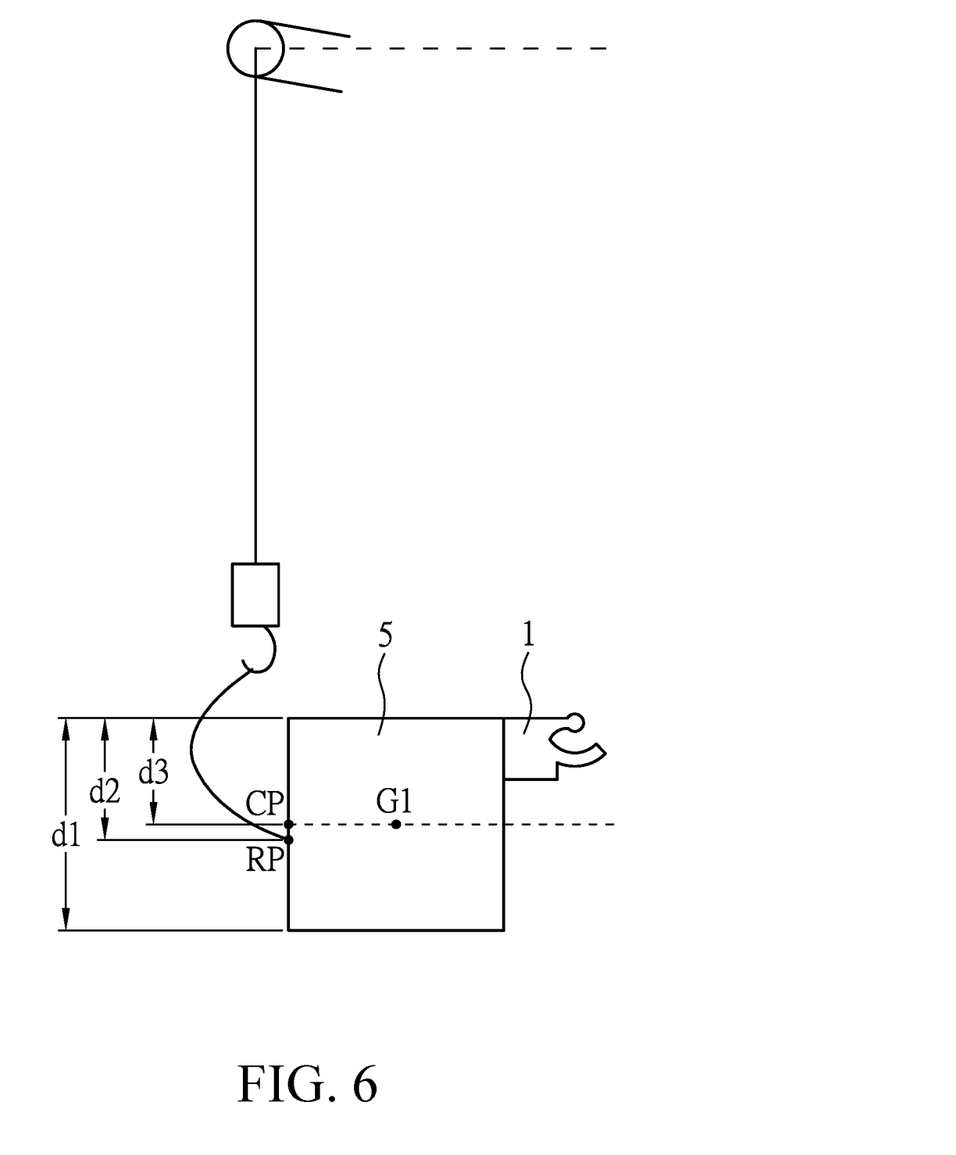
FIG. 6 is a schematic view showing an embodiment of the crane truck and the hanging position of the present invention.

Afterwards, the method 400 executes step S430 to calculate a hanging position according to a centroid position of the first entity and to calculate a center position of the surface of the first entity, when the first entity is in a hanging status, a first included angle is formed by a connecting direction of the hanging position and the centroid position and a connecting direction of the center position and the centroid position. In the embodiment, reference is made to FIG. 6, which is a schematic view showing an embodiment of the crane truck and the hanging position of the present invention. As shown in FIG. 6, a center position CP is calculated according to a distance d1 corresponding to the side surface of the first entity 5, and a hanging position RP is on the side surface of the first entity 5. A distance d2 is calculated from the hanging position RP to the upper surface of the first entity 5, and a distance d3 is calculated from the center position CP to the upper surface of the first entity 5. It is noticed that, the distance d2 is larger than the distance d3. In other words, the horizontal position of the hanging position RP is lower than the horizontal position of the center position CP.

Figure 7:
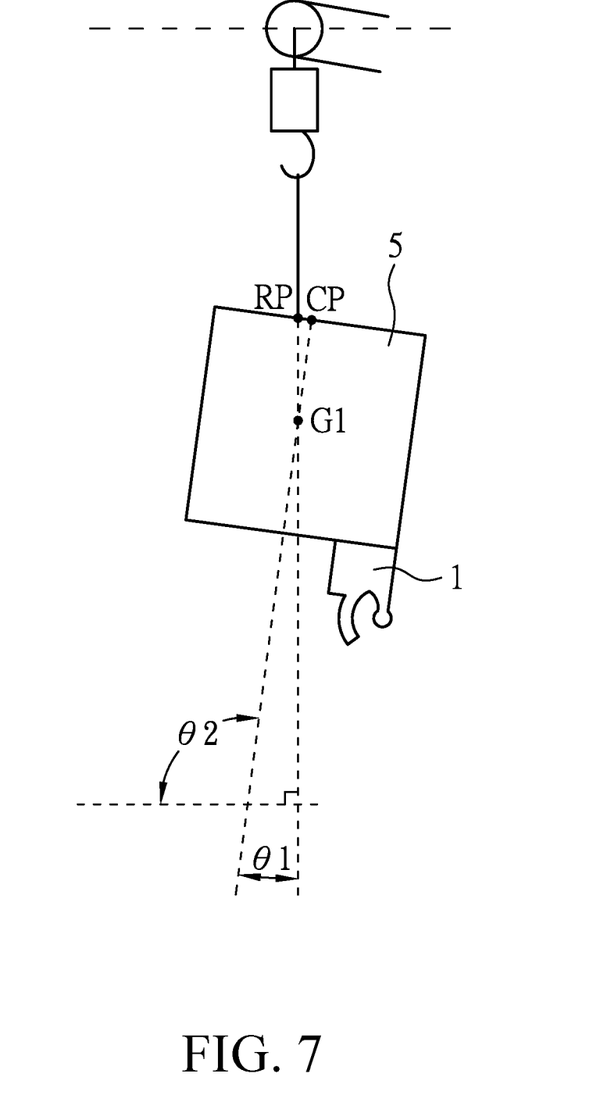
FIG. 7 is a schematic view showing an embodiment of the first entity in the hanging status of the present invention.

Afterwards, reference is made to FIG. 7, which is a schematic view showing an embodiment of the first entity in the hanging status of the present invention. As shown in FIG. 7, when the crane truck hoists the first entity 5, the first included angle $\theta 1$ is formed by the connecting direction of the hanging position RP and the centroid position G1 and the connecting direction of the center position CP and the centroid position G1. In the embodiment, the first included angle $\theta 1$ is the inclination angle formed by the hanging position RP and gravity when the first entity 5 is hoisted. Therefore, the hanging position is corresponding to the shape and the weight of the first entity 5 to form an appropriate inclination angle, so that the first latching member and the second latching member can be engaged.

Figure 8:
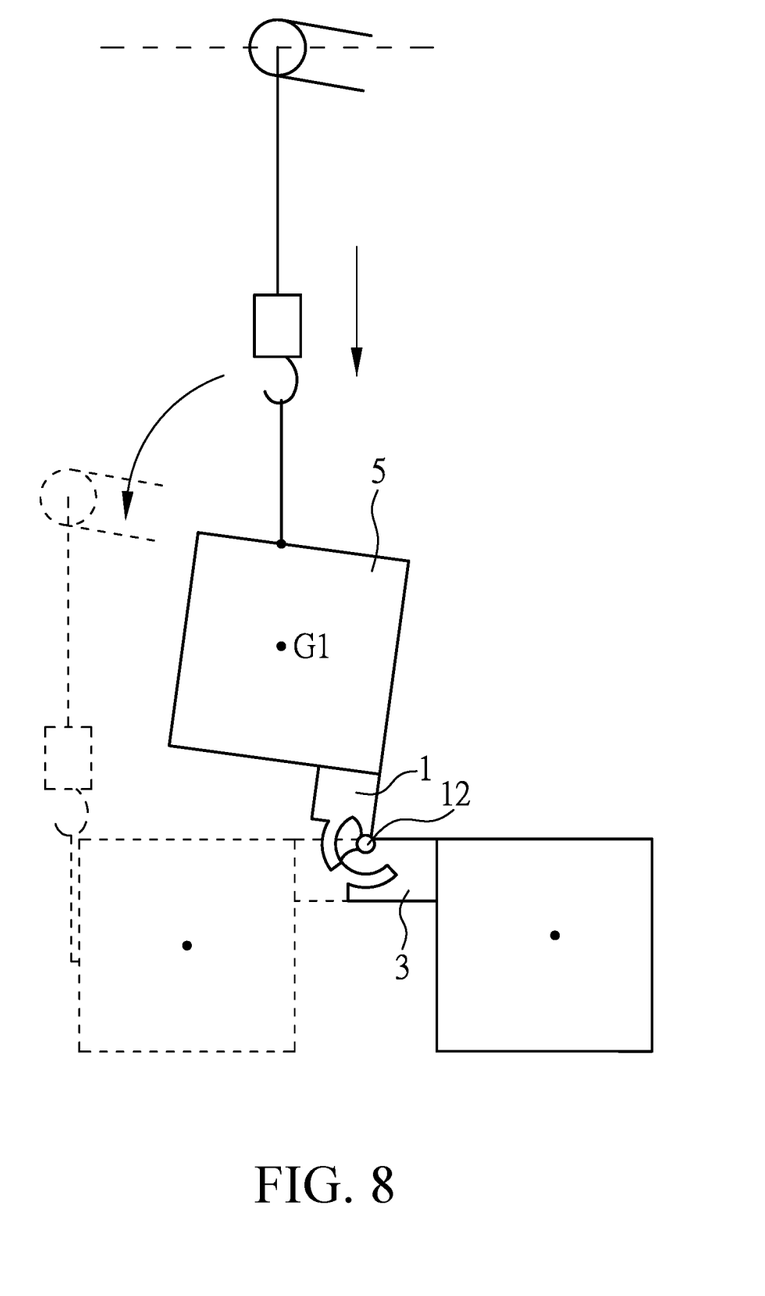
FIG. 8 is a schematic view showing an embodiment of the first latching member and the second latching member in the assembling status of the present invention.

Afterwards, the method 400 executes step S440 to assemble the first latching member and the second latching member, when the first latching member and the second latching member are in an assembling status, the first entity is utilized the headend as a rotation center to rotate an angle formed by a second included angle to drive the first latching member to engage with the second latching member. In the embodiment, reference is made to FIG. 8, which is a schematic view showing an embodiment of the first latching member and the second latching member in the assembling status of the present invention. As shown in FIG. 8, the headend 12 of the first latching member 1 abuts against the second latching member 3, and the first latching member 1 and the second latching member 3 are in the assembling status.

Figure 9:
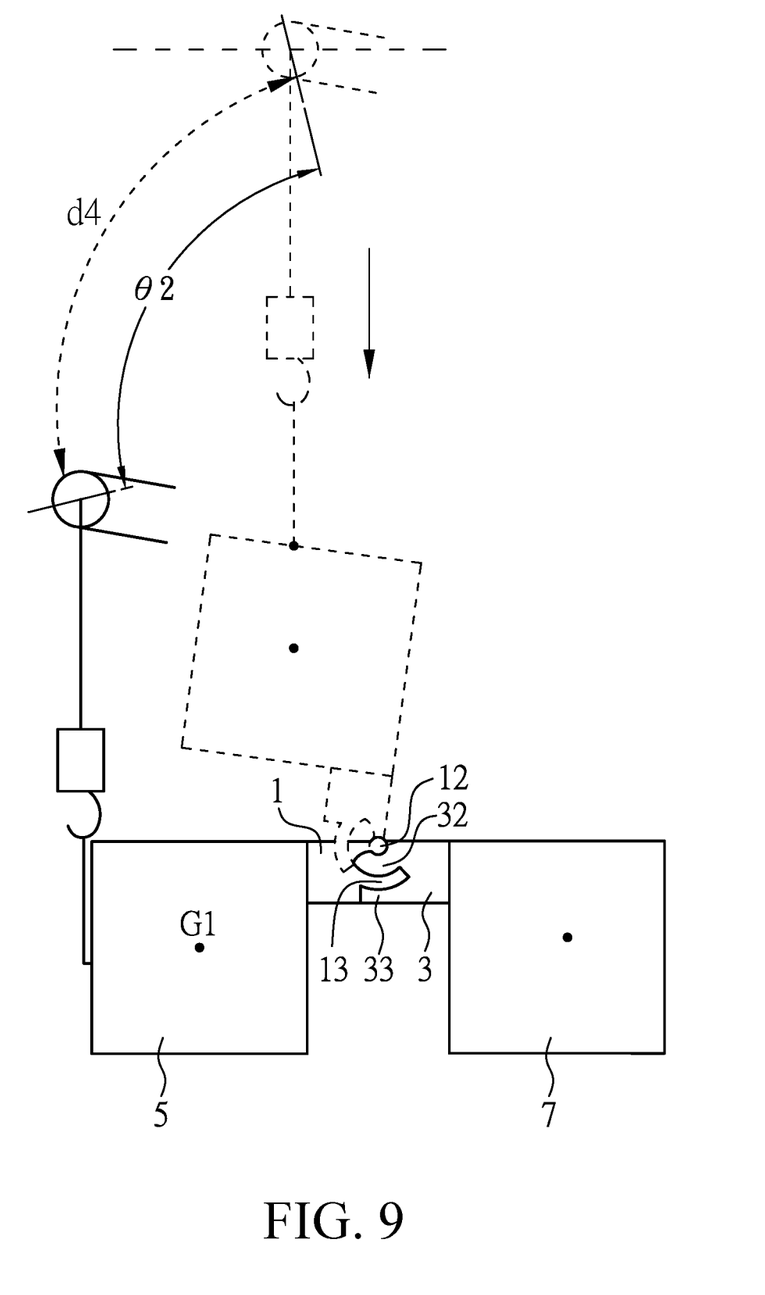
FIG. 9 is a schematic view showing an embodiment of the first entity and the second entity connected through a joint structure of the present invention.

Afterwards, reference is made to FIG. 9, which is a schematic view showing an embodiment of the first entity and the second entity connected through a joint structure of the present invention. As shown in FIG. 9, when the headend 12 of the first latching member 1 abuts against the second latching member 3, the crane truck moves a distance d4, so that the first entity 1 drives the first latching member 1 to rotate the angle formed by the second included angle $\theta 2$, and further makes the first latching member 1 and the second latching member 3 engage. It is noticed that, the second included angle $\theta 2$ is the complementary angle of the first included angle $\theta 1$, and a degrees corresponding to the inner side edge 131 of the first convex portion 13 are the same as the angle formed by the second included angle $\theta 2$.

Afterwards, when the first latching member 1 and the second latching member 3 are in an assembling status, the first entity 1 is utilized the headend 12 as the rotation center to rotate the angle formed by the second included angle $\theta 2$, so that an outer peripheral edge of the first convex portion 13 is engaged to an outer peripheral edge of the second convex portion 32, and slidably engaged to the concave portion. The concave portion is formed between the second convex portion 32 and the third convex portion 33. It is noticed that, because the degrees that the first entity 1 drives the first engaging member 1 to rotate (the second included angle $\theta 2$) is the same as the degree corresponding to the inner side edge 131 of the first convex portion 13, the first convex portion 13 is slidably engaged to the concave portion.

Afterwards, in the embodiment, the headend 12 of the first engaging member 1 is engaged to the second engaging member 3, and the first engaging member 1 is utilized the headend 12 as the rotation center and slidably engaged between the second convex portion 32 and the third convex portion 33. In this way, the crane truck can use the joint structure to directly assemble the suspended objects (e.g. steel bars and cement blocks), and does not require additional manpower and additional equipment to assist in calibration during assembly. Therefore, the joint structure can increase the speed of assembly and is easier to introduce into the existing construction environment.

In another embodiment, when the first latching member 1 and the second latching member 3 are in the assembling status, the second latching member 3 abuts against the circular side 121 of the headend 12, and the second latching member 3 is slidably engaged between the headend 12 and the first convex portion 13 with the headend 12 as a rotation center. It is noticed that, when the first latching member 1 and the second latching member 3 are engaged, another bolt structure can be used to strengthen the connection between the first latching member 1 and the second latching member 3. However, the disclosure is not limited thereto.

Based on aforesaid embodiments, the joint structure and the method for assembling a joint structure are capable of utilizing the weight of the suspended object and its own rotation, and cooperating with the joint structure to achieve the effect of automatic assembly. Thus, the crane truck can use the joint structure to directly assemble the suspended objects, and does not require additional manpower and additional equipment to assist in calibration during assembly. In some embodiments, this disclosure is able to achieve the effect of reducing labor costs and increasing the speed of assembly.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A method for assembling a joint structure, the joint structure including a first latching member and a second latching member, the first latching member including a first main body, a headend extending from the first main body, and a first convex portion extending from the first main body, the second latching member including a second main body, a second convex portion extending from the second main body, and a third convex portion extending from the second main body, the method for assembling the joint structure comprising:

calculating a first installed position of the first latching member and a second installed position of the second latching member, wherein the first installed position is located on a surface of a first entity, and the second installed position is located on a surface of a second entity;

installing the first latching member in the first installed position and installing the second latching member in the second installed position;

calculating a hanging position and a center position on a second surface of the first entity according to a centroid position of the first entity, wherein a first included angle is defined by a line connecting the hanging position and the centroid position and a line connecting the center position and the centroid position;

hanging the first entity at the hanging position; and assembling the first latching member and the second latching member by abutting the headend on a second inner side of the second convex portion to make the first entity rotate about the headend by a second included angle.

2. The method for assembling a joint structure of claim 1, wherein when the first entity rotates about the headend by the second included angle, an outer peripheral edge of the first convex portion is engaged to an outer peripheral edge of the second convex portion, and slidably engaged between the second convex portion and the third convex portion.

3. The method for assembling a joint structure of claim 1, wherein an inner side edge of the first convex portion is arc-shaped, a degree corresponding to the inner side edge of the first convex portion is the same as the second included angle.

4. The method for assembling a joint structure of claim 3, wherein a curvature rate corresponding to the inner side edge of the first convex portion is the same as a curvature rate corresponding to an outer side edge of the second convex portion.

* * * * *